United States Patent [19]

Wataya

[11] Patent Number: 4,991,554
[45] Date of Patent: Feb. 12, 1991

[54] DEVICE FOR CONTROLLING IGNITION TIMING OF ENGINE

[75] Inventor: Seiji Wataya, Himeji, Japan

[73] Assignee: Mitsubishi Denki Kabushiki Kaisha, Tokyo, Japan

[21] Appl. No.: 467,429

[22] Filed: Jan. 19, 1990

[30] Foreign Application Priority Data

Jan. 20, 1989 [JP] Japan .................................. 1-12936

[51] Int. Cl.$^5$ .............................................. F02P 5/15
[52] U.S. Cl. .................................... 123/425; 73/117.3
[58] Field of Search ...................... 123/425, 435, 494; 73/117.3, 118.2

[56] References Cited

U.S. PATENT DOCUMENTS

| | | | |
|---|---|---|---|
| 4,913,117 | 4/1990 | Hashimoto et al. | 123/435 X |
| 4,913,118 | 4/1990 | Watanabe | 123/435 |

FOREIGN PATENT DOCUMENTS 21913 5/1981 Japan .
103965 6/1984 Japan .

Primary Examiner—Tony M. Argenbright
Attorney, Agent, or Firm—Sughrue, Mion, Zinn, Macpeak and Seas

[57] ABSTRACT

A device for controlling ignition timing of an engine has a sensor 10 for reading and storing the pressure of a gaseous mixture within each cylinder of a multiple cylinder engine at a predetermined crank angle in the compression cycle; a calculation unit 11 for calculating a charged air quantity or engine load based on the gaseous pressure and the temperature of an intake air; and a control unit 11 responsive to the engine load and the number of engine rotations to determine the ignition timing for the cylinder to be ignited next or the next cycle in its own cylinder.

5 Claims, 6 Drawing Sheets

DEVICE FOR CONTROLLING IGNITION TIMING OF ENGINE

BACKGROUND OF THE INVENTION

The present invention relates to a device for controlling the ignition timing of an engine with the pressure within the cylinder.

Devices for electronically controlling the ignition timing of an automotive gasoline engine to improve the engine output, response, and exhaust are known. The practical devices make use of the output of an air flow meter or the pressure within the intake pipe as engine load information for calculating the ignition timing. Of these two systems, the air flow meter system is high in measuring precision but expensive. The intake pressure detection system, on the other hand, is relatively inexpensive but lower in measuring precision than the air flow meter system.

A conventional intake pressure detection system is shown in FIG. 7. There is provided a throttle valve 3 in the intake passage 2 of an engine 1. At the downstream from the throttle valve 3 there is provided a surge tank 2a which is equipped with a pressure sensor 4. An injector 5 is mounted on the intake passage 2 to inject a fuel toward a combustion chamber 12. At the upstream therefrom there is provided an intake temperature sensor 6 for detecting the intake temperature within the intake passage 2. A spark plug 7 is mounted on the combustion chamber 12 and connected to an ignition coil 9 via a distributor 8. The ignition coil 9 and the injector 5 are controlled by a computer unit 11. A water temperature sensor 13 detects the temperature of a coolant for the engine 1. A rotation sensor 14 picks up the rotation signal of the engine 1.

The signal of the pressure sensor 4 is taken as a parameter indicative of the quantity of air charged into the combustion chamber 12. This signal is corrected with the signal of the intake temperature sensor 6 and then the correction factor which has been measured with respect to the charge efficiency which varies with the engine speed and the load and stored in a read only memory (ROM) for use as an engine load. The ignition timing is determined based on the map value which is related to the above engine load and the engine speed, and an ignition signal is outputted to the ignition coil 9.

In the conventional, inexpensive intake pressure detection system, the quantity of air charged into the combustion chamber 12 is detected indirectly based on the intake pressure so that when the charge efficiency changes due to the operation timing of the intake and exhaust valves and the engine speed, the detection precision of the quantity of air or engine load is very low. In addition, the operation of the intake valve gives rise to pulsation in the intake passage 2 so that there is a time lag for averaging the detected signals, resulting in the poor response.

SUMMARY OF THE INVENTION

Accordingly, it is an object of the invention to provide a device for controlling the ignition timing of an engine, which is free from the response delay required for averaging the detected signals and able to detect the quantity of air charged into the combustion chamber or engine load with high precision, thus providing accurate ignition timing.

According to the invention there is provided a device for controlling an engine ignition timing, which includes a cylinder pressure sensor mounted on each cylinder of a multiple cylinder engine; a crank angle sensor for detecting a crank angle; an intake air temperature sensor for detecting a temperature of intake air in an intake passage; a pressure storage unit for reading and storing a cylinder pressure outputted from the cylinder pressure sensor whenever an output signal of the crank angle sensor reaches a predetermined crank angle in a compression cycle; a load calculation unit for calculating an engine load based on the cylinder pressure and the intake air temperature as primary parameters; and an ignition timing unit for determining ignition timing based on the number of engine rotations and the engine load for a cylinder to be ignited next or for the next cycle of ignition in its own cylinder.

Other objects, features, and advantages of the invention will be apparent from the following description when taken in conjunction with the accompanying drawings.

DESCRIPTION OF THE PREFERRED EMBODIMENT

Figure 1:
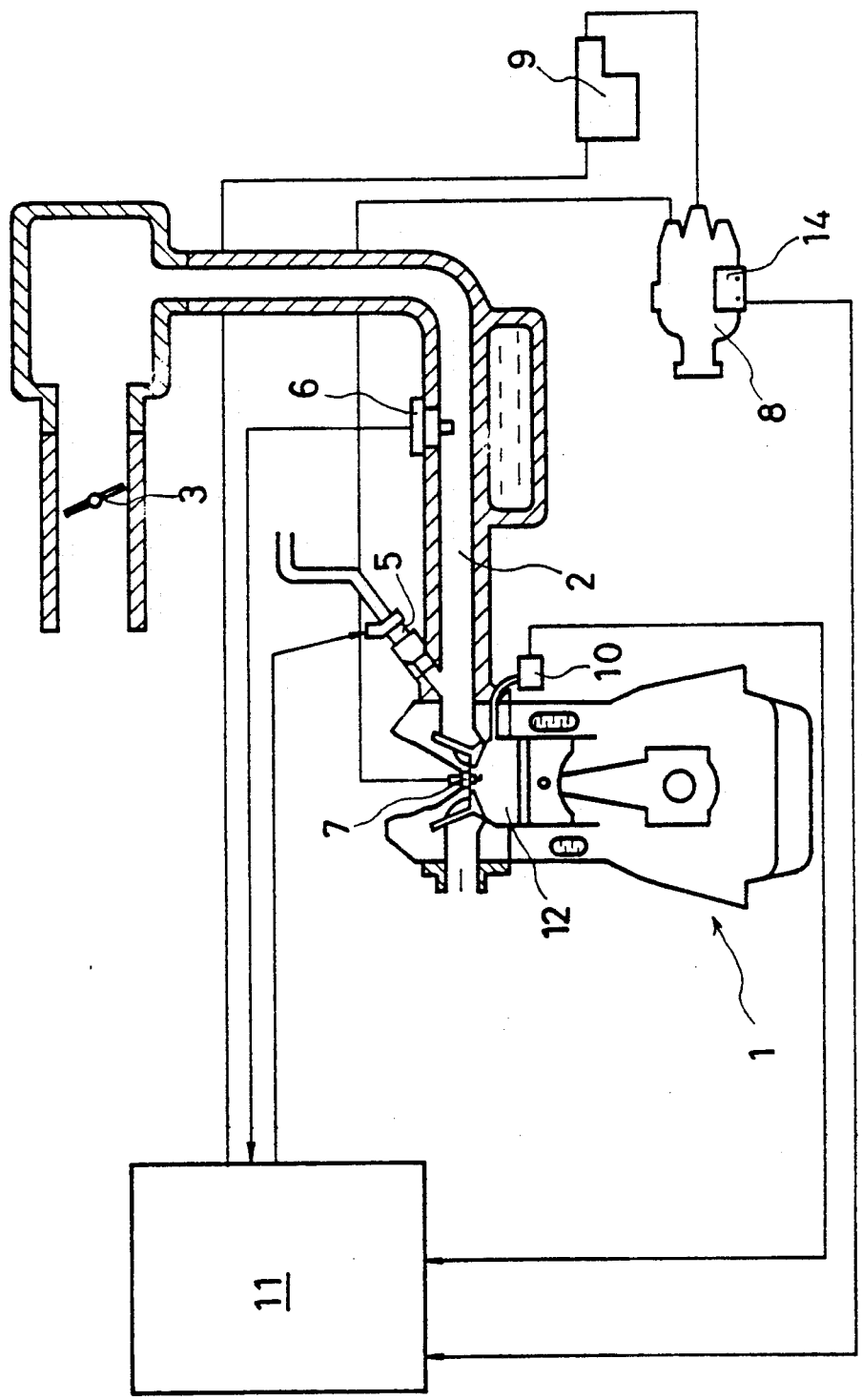
FIG. 1 is a schematic diagram of a device for controlling the ignition timing of an engine according to an embodiment of the invention.

In FIG. 1, a throttle valve 3 is provided in the intake passage 2 of an engine 1 to regulate the quantity of an intake air. At the downstream therefrom there is mounted an injector 5 to inject a fuel toward a combustion chamber 12. An intake temperature sensor 6 is mounted on the intake passage 2 between the throttle valve 3 and the injector 5 to detect the temperature of an intake air. A spark plug 7 is mounted on the combustion chamber 12 and connected to an ignition coil 9 via a distributor 8. A cylinder pressure sensor 10 is mounted on the combustion chamber 12 of each cylinder to detect the pressure within the cylinder. A rotation sensor 14 is mounted on the distributor 8 to pick up the rotation signal of the engine 1. The output signals of the cylinder pressure sensor 10 and the rotation sensor 14 are inputted to a computer unit 11 to control the ignition coil 9 and the injector 5.

Figure 2:
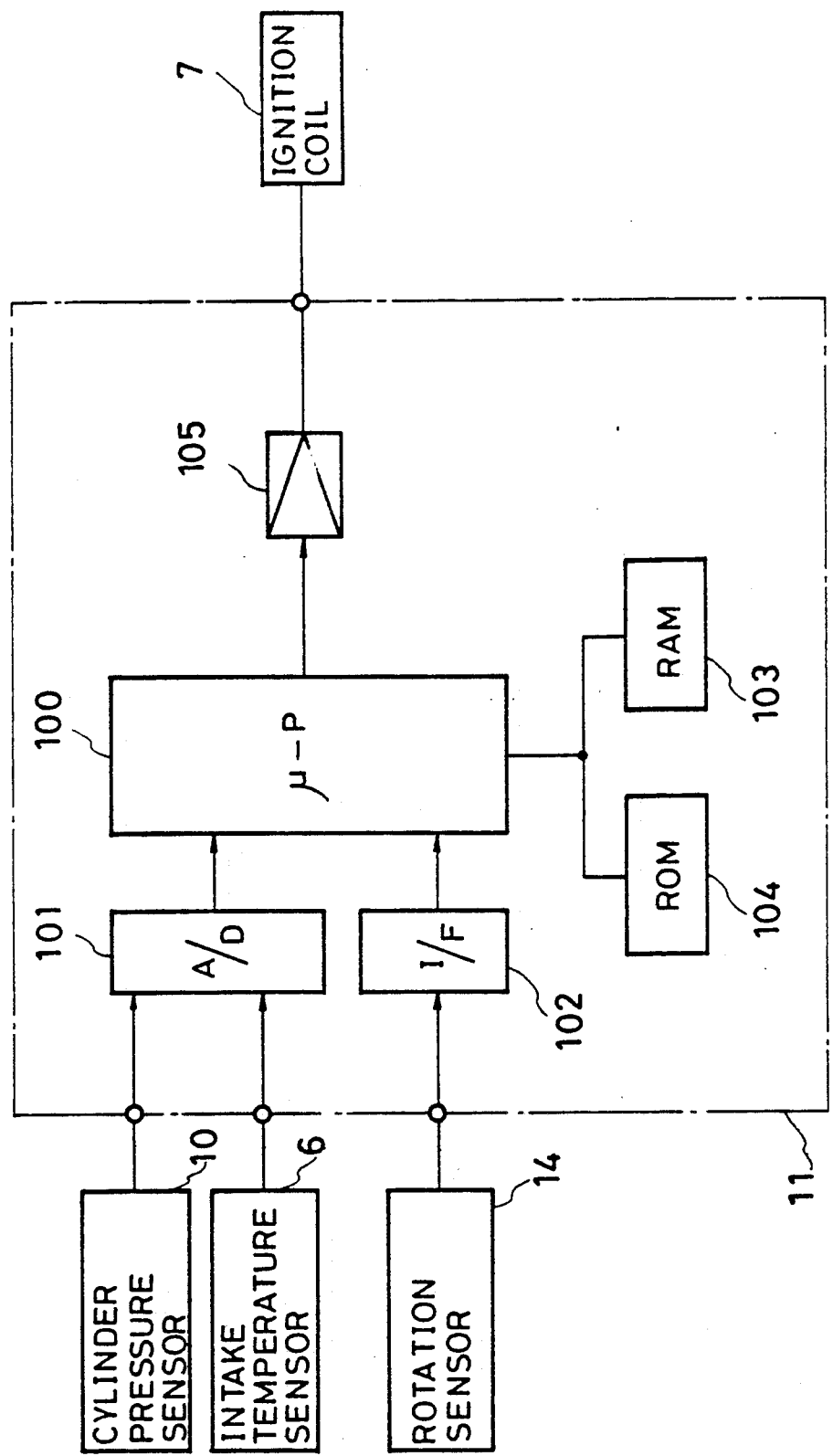
FIG. 2 is a block diagram of a computer unit useful for the device of FIG. 1.

In FIG. 2, the computer unit 11 consists of a microprocessor 100; an A/D converter 101 for converting an analog signal to a digital signal and feeding the data to the microprocessor 100; an input circuit 102 for shaping the waveform of a pulse signal; a random access memory (RAM) 103; a read only memory (ROM) 104 in which the control procedure to be executed by the microprocessor has been stored; and an output circuit 105 for feeding a control signal to the ignition coil 9.

Figure 3:
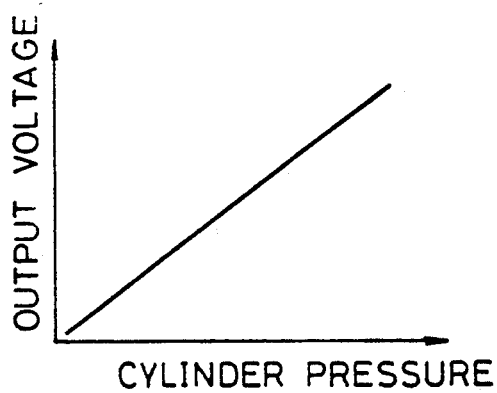
FIG. 3 is a graph showing the characteristics of a cylinder pressure sensor used in the device of FIG. 1.

An example of the cylinder pressure sensor 10 is a semiconductor sensor using a piezoelectric resistor which operates on the same principle as that of the conventional intake pressure sensor. The characteristics of the cylinder pressure sensor 10 is shown in FIG. 3, wherein the output voltage increases in proportion to the cylinder pressure.

The operation of the device will be described with reference to FIGS. 4-6.

Figure 4:
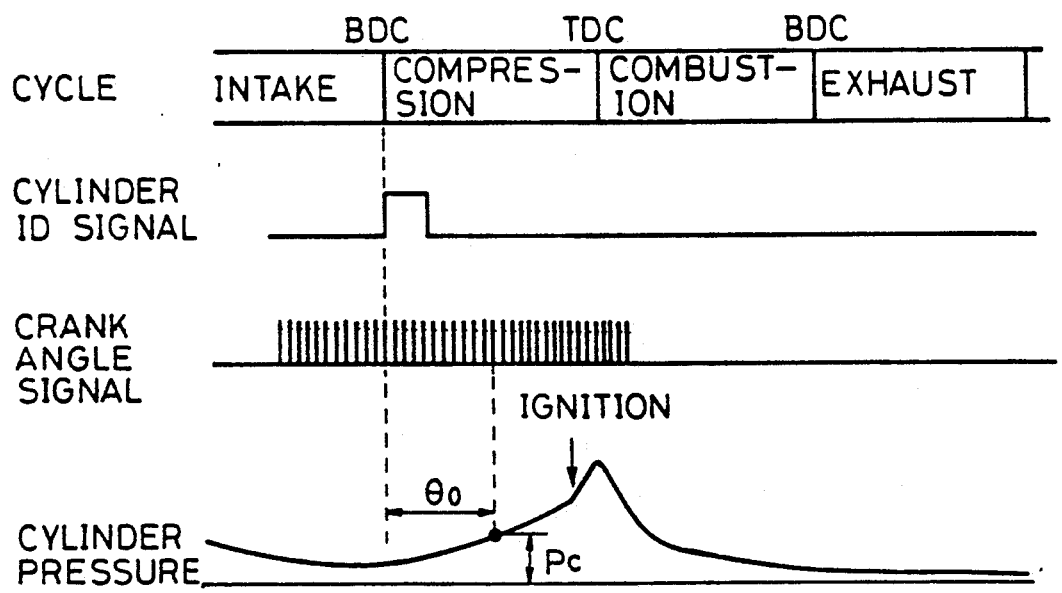
FIG. 4 is a timing chart showing the operation of the device of FIG. 1.
Figure 5:
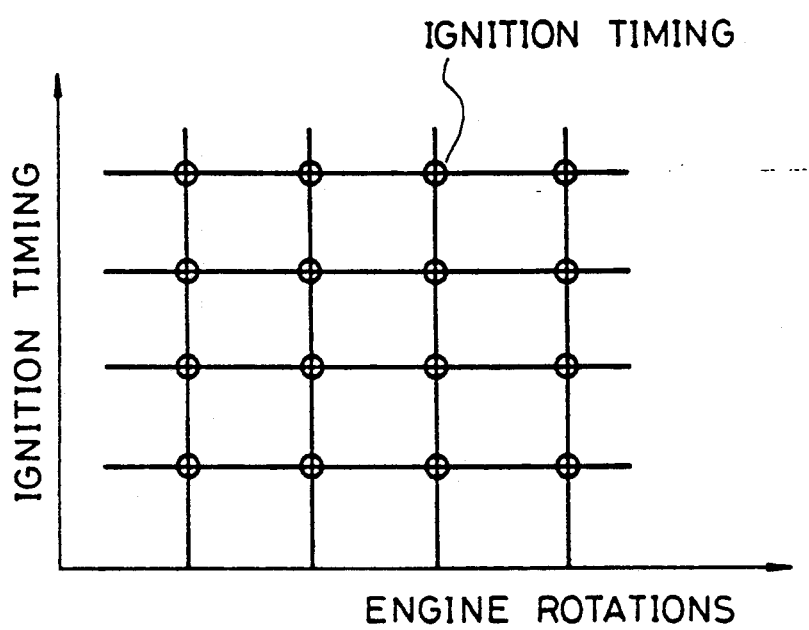
FIG. 5 is a graph showing an ignition timing map for use in the device of FIG. 1.

In FIG. 4, how the cylinder pressure sensor 10 is read is shown. The cylinder identification signal and the crank angle signal are picked up by the rotation sensor 14 mounted on the distributor 8. Since the distributor 8 is driven by the camshaft (not shown) of the engine 1, it is possible to pick up both the cylinder identification signal and the crank angle signal by mounting a pair of sensors on the distributor 8. The required resolution of the crank angle is about one degree so that it is necessary to use a high-precision sensor consisting of a conventional photointerruptor and a slit plate.

Figure 6:
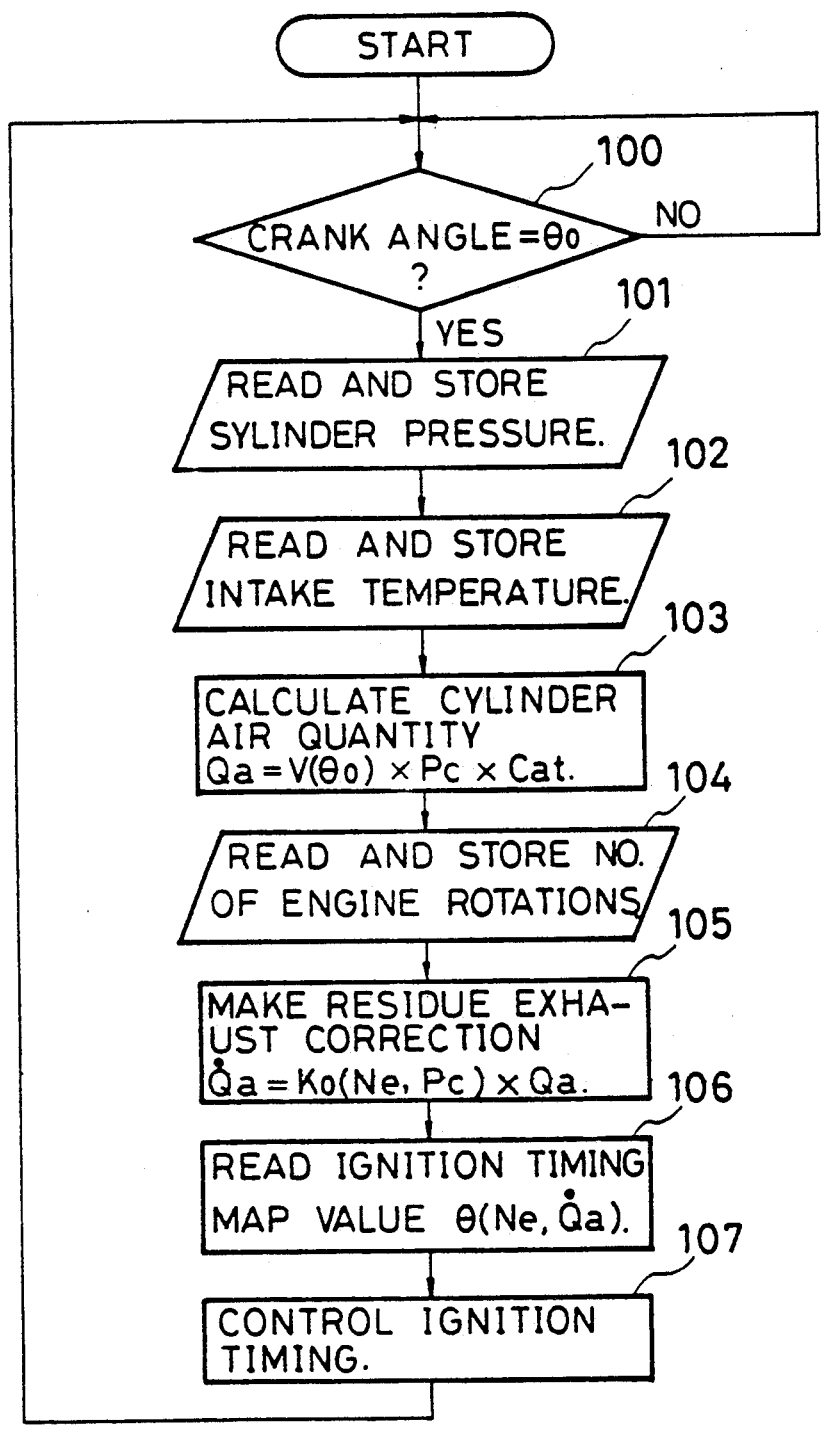
FIG. 6 is a flowchart showing the operation of the device of FIG. 1.
Figure 7:
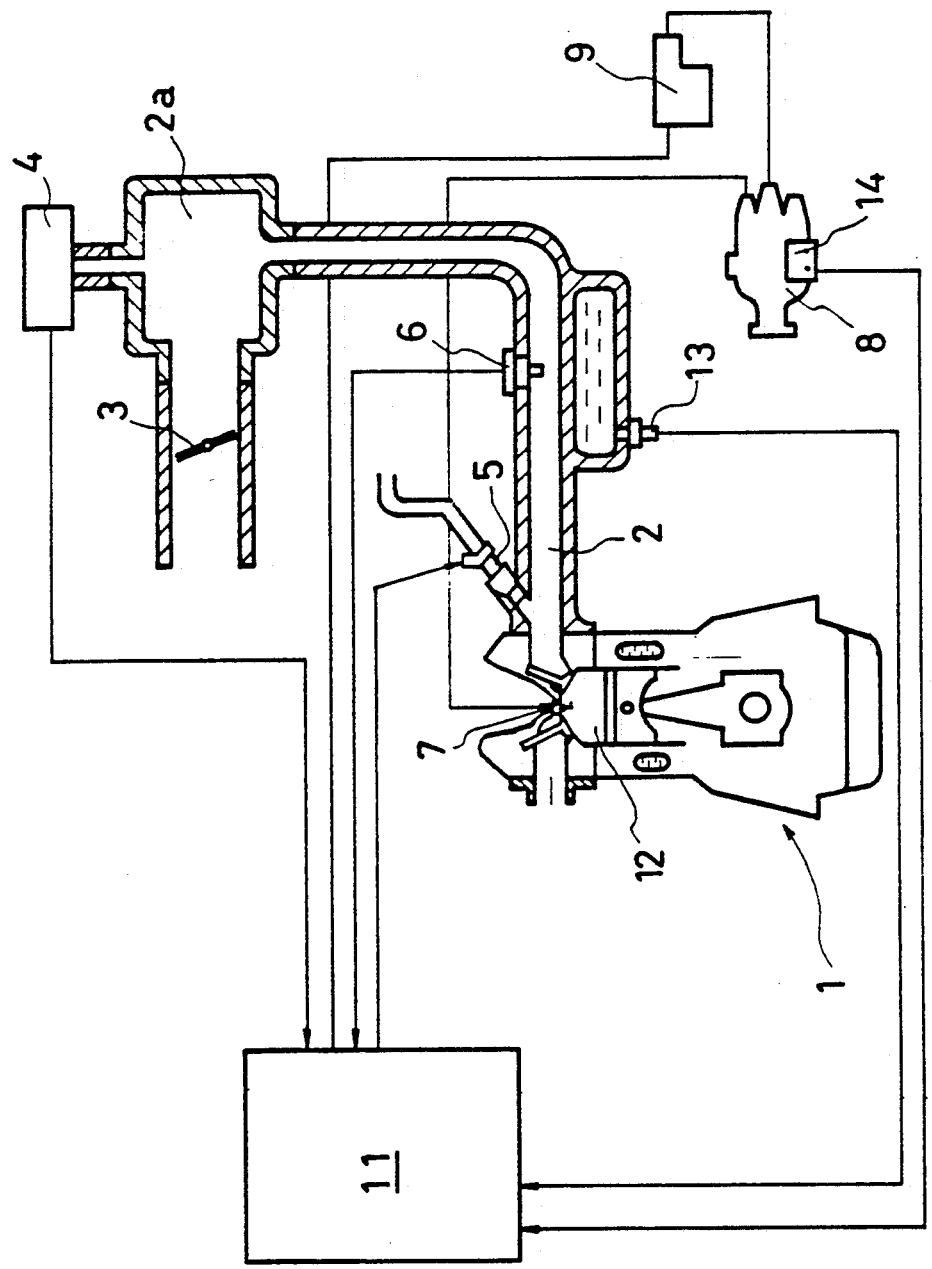
FIG. 7 is a schematic diagram of a conventional device for controlling the ignition timing of an engine.

The microprocessor 100 of the computer unit 11 counts pulses of the crank angle signal with reference to the cylinder identification signal which is generated at the bottom dead center (BDC) of the compression cycle and decides whether the pulse count reaches a predetermined crank angle $\theta o$ (the step 100 in FIG. 6). As soon as the pulse count reaches the predetermined angle $\theta o$, it reads the cylinder pressure Pc outputted from the cylinder pressure sensor 10 and stores it in the RAM 103 or its register (the step 101). Then, it reads and stores the temperature of an intake air detected by the intake temperature sensor 6 (the step 102). Then, it multiplies the cylinder pressure Pc by the air temperature correction factor Cat which depends on the temperature detected by the intake temperature sensor 6 to give an air density, which is then multiplied by the cylinder volume $V(\theta o)$ at the above crank angle $\theta o$ to give the quantity of air Qa charged in the cylinder (the step 103).

The number of engine rotations Ne is then calculated from the period of pulses outputted from the rotation sensor 14 (the step 104). The cylinder air quantity Qa is then multiplied by the charge correction factor Ko(Ne, Pc) which is a function of the number of engine rotations Ne and the cylinder pressure Pc to give a true cylinder air quantity $\overset{\circ}{Q}a$ (the step 105). This correction eliminates the error produced by the residual exhaust which is determined by the engine operation conditions. The ignition timing is then read out of the map of FIG. 5 based on the number of engine rotations Ne and the true cylinder air quantity $\overset{\circ}{Q}a$ (the step 106). The ignition timing at which the ignition coil 9 is turned off is controlled (the step 107). Where the number of engine rotations or the engine load gets out of the map point, the ignition timing is determined by interpolation.

In the above embodiment, the cylinder pressure Pc is read at the crack angle $\theta o$ set between the close of an intake valve and the bottom dead center in the compression cycle to give a cylinder air quantity $\overset{\circ}{Q}a$ or load information. The true cylinder air quantity $\overset{\circ}{Q}a$ is used as an engine load for the cylinder to be ignited next or its own cylinder for the next cycle of ignition. In order to provide good acceleration or deceleration response, the true cylinder air quantity $\overset{\circ}{Q}a$ detected at a predetermined crack angle should be used for the cylinder to be ignited next. Where the charged air quantity varies widely from cylinder to cylinder or in the steady state, the true air quantity $\overset{\circ}{Q}a$ should be used as load information for determining the next ignition in its own cylinder.

The density correction made by the average temperature of a gaseous mixture within the cylinder at a predetermined crank angle $\theta o$ is more accurate than the density correction made by the temperature of an intake air as described above. However, the temperature sensor mounted in the cylinder is exposed to high temperatures in the combustion cycle so that it is impossible to provide the required detection response, resulting in the incorrect measurement of temperatures of the gaseous mixture.

According to the invention, the pulsating components of a signal produced in the conventional intake pressure detection system is eliminated, which in turn eliminates the response delay required for averaging signals. Since the cylinder pressure is directly detected, the precision of an engine load detected is higher than that of the use of an intake pressure.

I claim:

1. A device for controlling an engine ignition timing, comprising:
    a cylinder pressure sensor mounted on each cylinder of a multiple cylinder engine;
    a crank angle sensor for detecting a crank angle;
    an intake air temperature sensor for detecting a temperature of intake air in an intake passage;
    pressure storage means for reading and storing a cylinder pressure outputted from said cylinder pressure sensor whenever an output signal of said crank angle sensor reaches a predetermined crank angle in a compression cycle;
    load calculation means for calculating an engine load based on said cylinder pressure and said intake air temperature as primary parameters; and
    ignition timing means for determining ignition timing based on the number of engine rotations and said engine load for a cylinder to be ignited next or for the next cycle of ignition in its own cylinder.

2. The device of claim 1, wherein said engine load is a cylinder air quantity which is determined by a product of a cylinder volume at said predetermined crank angle, said cylinder pressure, and said intake air temperature.

3. The device of claim 2, wherein a true cylinder air quantity is determined by multiplying said cylinder air quantity by a function of said cylinder pressure and the number of engine rotations outputted from said crank angle sensor.

4. The device of claim 3, wherein said true cylinder air quantity is used as said engine load.

5. The device of claim 3, wherein said true cylinder air quantity is used as said engine load for determining an ignition timing in its own cylinder.

* * * * *